United States Patent Office 3,299,728
Patented Jan. 24, 1967

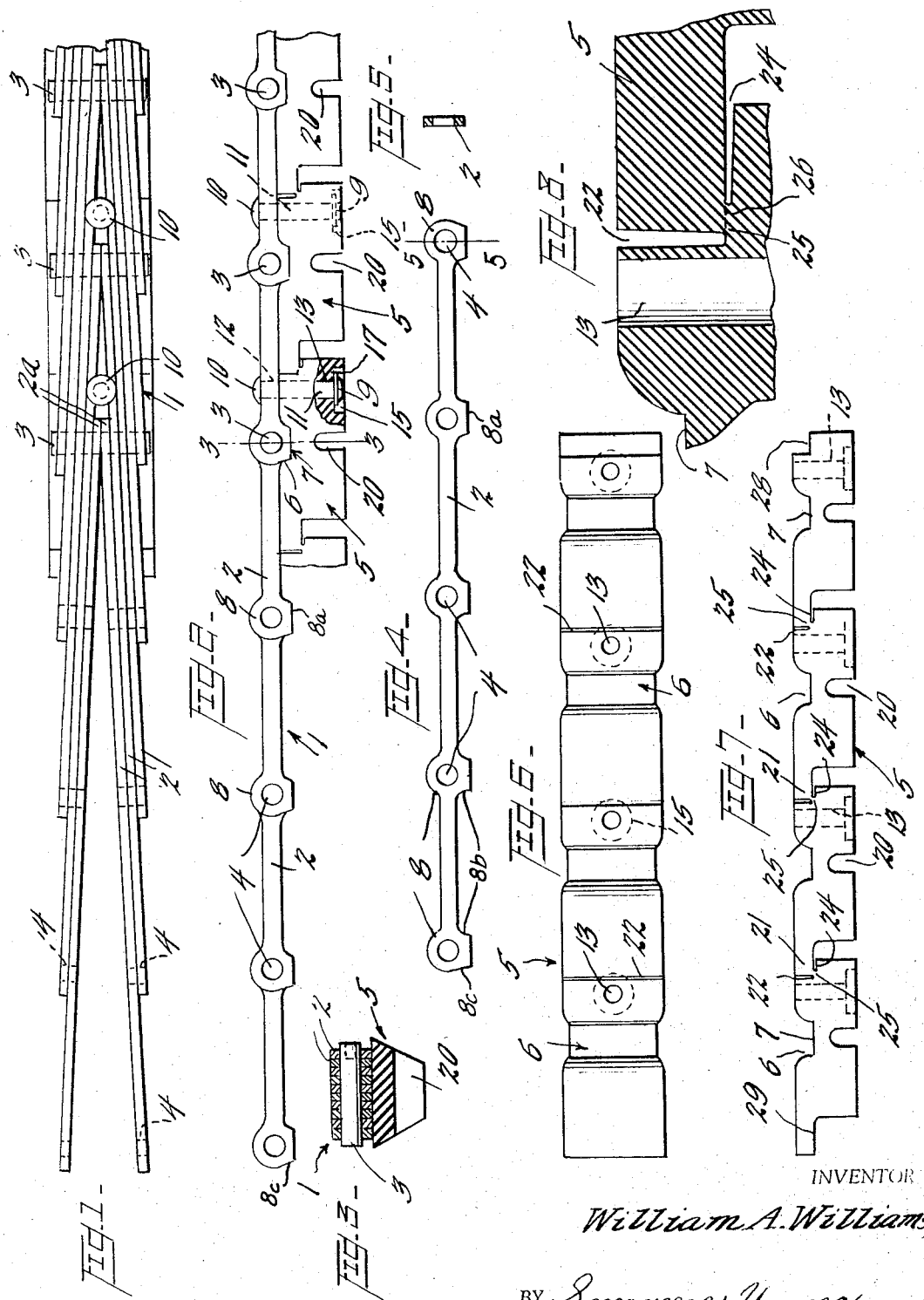

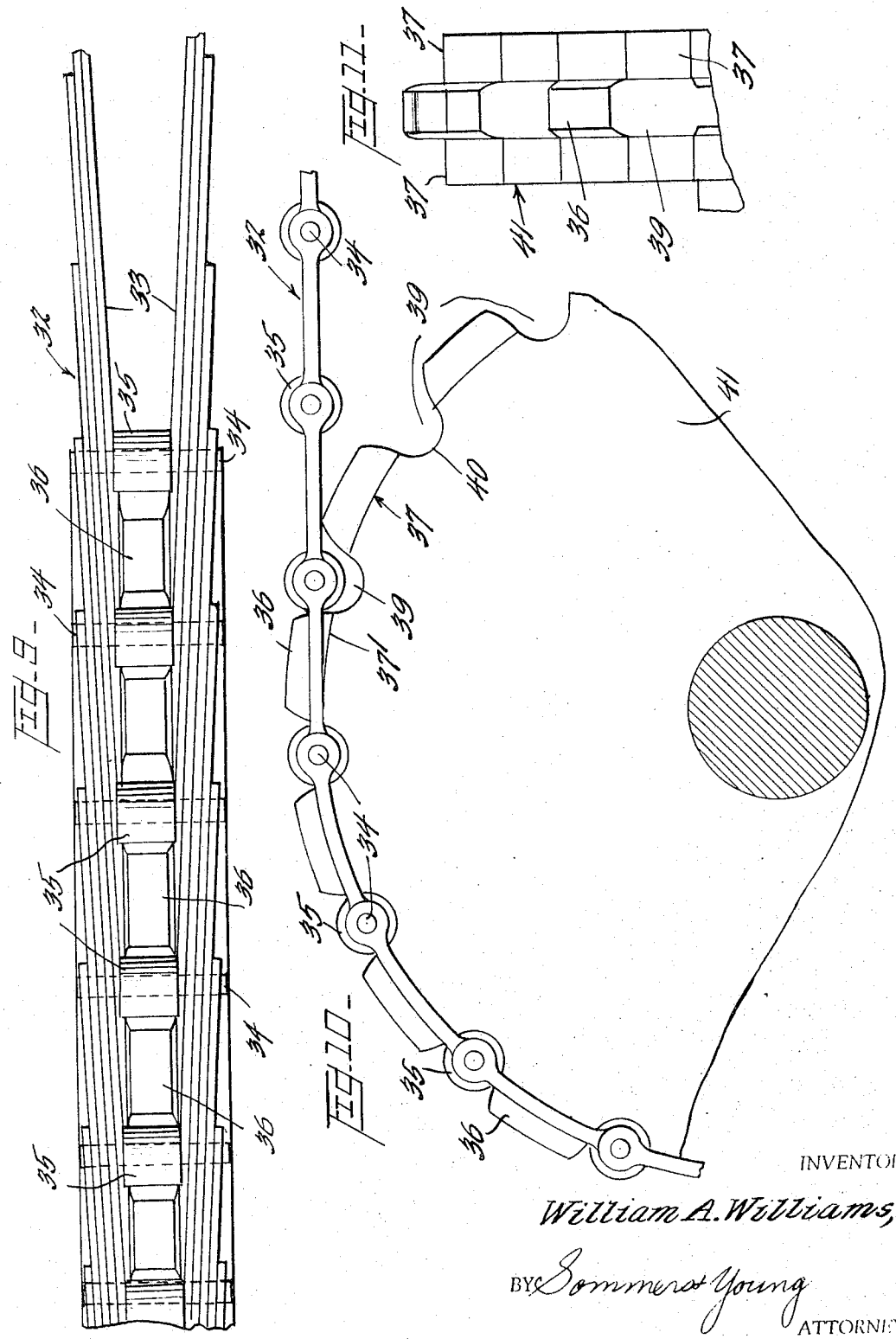

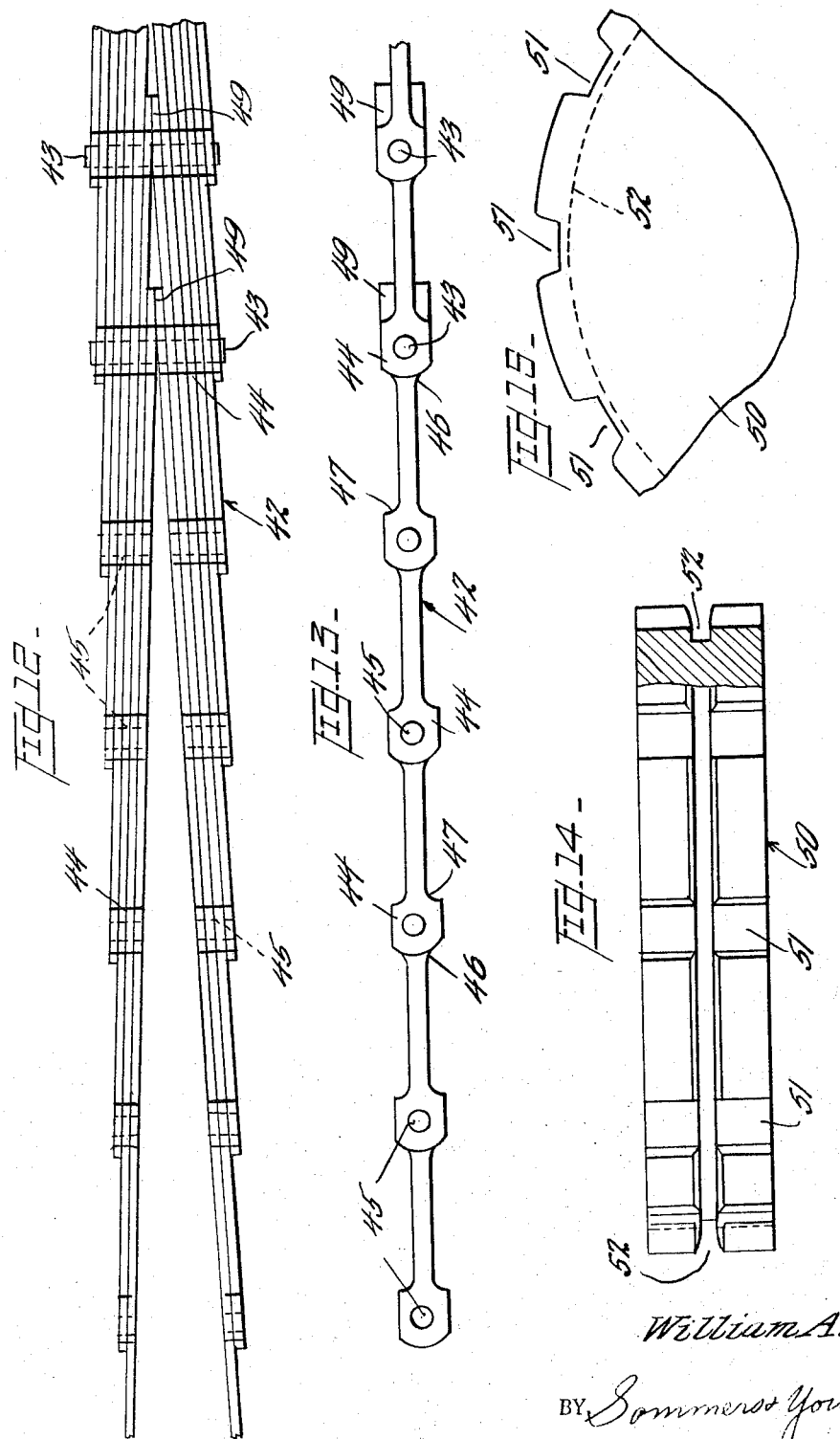

3,299,728
OPEN-END POWER TRANSMISSION BELT
William A. Williams, 316 E. Wadsworth St.,
Philadelphia, Pa. 19119
Filed Sept. 18, 1964, Ser. No. 397,544
13 Claims. (Cl. 74—235)

This invention relates to power transmitting belts of the open-end type, that is, belts which can be opened up to permit installation around a continuous shaft, or can be opened up for either adding or removing a portion of the belt to make it longer or shorter.

An object of this invention is to provide a belt the length of which is alterable by purely mechanical means.

A further object of this invention is to provide a belt which can be made up to any desired length from a stock of continuous uninterrupted length.

Another object of this invention is to provide a V-type power transmission belt of alterable length which will deliver approximately the same horsepower as existing V-type belts of unalterable length.

A still further object of this invention is to provide a V-type power transmission belt which will not stretch appreciably when operating at its rated horsepower, but which will deliver its rated power over a long period of time without take-up of slack.

Still another object of this invention is to provide an open end V-type belt which will be smooth running and quiet in operation.

A further object of this invention is to provide an open end V-type belt having a plurality of transversely extending rigid rods serving as connecting elements, and to utilize substantially the entire lengths of said connecting elements for the attachment of flexible tension-carrying elements.

Another object of this invention is to provide an open end type power transmission belt comprised of a series of links each composed of a plurality of highly flexible strands of strong material at least some of which are arranged in echelon, and, are connected by rigid transverse pins whereby all or substantially all of the flexure of the belt required for operation occurs in the flexible strands rather than at the connections thereof with the transverse pins, whereby no wear occurs at the pins.

A still further object of this invention is to provide an open-end power transmission belt constituted of an assembly of tension-carrying members bound together in operation in a closed element, which assembly of tension-carrying members has a series of blocks of elastic material secured on its inner face, which blocks are shaped, in cross section, to suit the shape of the sheave or pulley with which they are to operate, for example, a V-groove sheave.

Still another object of this invention is the provision of a set of elastic blocks secured to the inner face of a closed tension-carrying band which blocks are so shaped as to fit one to another and are individually provided with certain grooves and clefts which facilitate their flexure during operation.

Another object of this invention is to provide an open-end power transmission belt comprising an assembly of tension-carrying members provided with a plurality of elastic members attached to its inner face which elastic block members can be relatively thick and have bevelled side walls to adapt the belt for use as either a narrow or wide V-type belt, or can have relatively thin elastic block members which adapt the belt for use as a flat belt.

In the accompanying drawings, FIGURE 1 is a plan view of a portion of a belt according to a first embodiment of the invention.

FIGURE 2 is a side view of a link of the belt according to the invention with the remainder of the complete belt represented diagrammatically.

FIGURE 3 is a cross-sectional view on the line 3—3 of FIGURE 2.

FIGURE 4 is a side view of a four-pitch link member of the tension-carrying part of the belt.

FIGURE 5 is a cross-sectional view on the line 5—5 of FIG. 4.

FIGURE 6 is a plan view of a strip of rubber bearing block.

FIGURE 7 is an elevational view of the strip of rubber bearing blocks.

FIGURE 8 is an enlarged view in section of the strip of bearing blocks.

FIGURE 9 is a plan view of a modification of the invention applied to an open end type roller belt.

FIGURE 10 is a side view of a belt according to the embodiment of FIG. 9 shown applied to a portion of a combination sprocket and pulley with which this type of belt is adapted to operate.

FIGURE 11 is an end view of a part of FIG. 9 viewed from the left.

FIGURE 12 is a plan view of a portion of an open-end belt representing a third embodiment of the principle of this invention applied to a set or assembly of tension-carrying members which are shaped with enlargements to form a sprocket-belt.

FIGURE 13 is a side view of FIG. 12 with the remainder of the band represented diagrammatically.

FIGURE 14 is a plan view of a portion of the operating face of a pulley showing the shape thereof which cooperates with the belt according to FIGS. 12 and 13.

FIGURE 15 is a side view of a portion of a sprocket wheel adapted to cooperate with the open-end sprocket-belt according to FIGS. 12 and 13.

In FIGURE 1 of the drawings numeral 1 designates, in general, one link of an open-end type belt. This belt is comprised primarily of an assembly of tension-carrying strands 2, held together in a definite arrangement by cross-pins 3 which pass through openings 4 in said strands, and by pads or blocks 5 mounted on the inner face of the belt.

In the tension-carrying assembly 1 the distance between two transverse pins 3 is considered as one pitch of the belt and the length of the strand members 2, that is, the number of pitches through which they extend, can be chosen at will within practical limits, providing the number is greater than one. For the purposes of the present illustrations strand members extending through four pitches of the belt are used, and a link of the belt, therefore, comprises four pitches.

Each strand member is provided with five of the equally spaced, laterally extending openings 4. Each strand member has one of its ends located toward the middle of one of the pins 3 and its other end toward an outer end portion of another of said pins spaced four pitches from said one pin.

Since the strand members lie close together a large proportion of the general area occupied by the belt is filled by the strands, whereas, if the alternate strands were spaced apart by the width of a strand only a comparatively small area would be occupied by the strands and the pulling efficiency of the belt would be much lower, say, about 50%. If tension strands having lengths of two pitches are used in the system of arrangement according to the invention, the efficiency will be around 66.7%, and with strands extending three pitches the pulling efficiency will be around 75%. Thus, the longer the strands, within practical limits the higher the efficiency becomes, but the longer the strands in terms of pitches the greater the number of pins that have to be removed to open the belt to remove or add a link, or place it around an endless shaft. In the embodiments representing the invention herein, the strands are illustrated as being of a length of four pitches, and as having five holes 4 for passage of pins 3. The pulling efficiency of such a belt is about 80%.

At each pin a starting pair of strand members is attached to the pin with the pin extending through their first holes, respectively. These starting strands have their starting end 2a side by side, engaging each other, and from these are divergent in the direction of extent of the belt (or vice versa) so that they are spaced apart after one pitch, at the next pin by an interval sufficient to straddle the starting ends of the next pair of starting strands, and the divergence of the strands continues until at the next (third) pin the interval is sufficient to straddle two pairs of strands; and so on until the first mentioned pair of strands straddle four pairs of strands. Of course, if one considers the opposite direction of extent of the belt the strands will have to be considered as converging instead of diverging.

The strands are provided with enlargements 8 at the location of each pin so as better to accommodate the openings through which the pins extend.

The tension-carrying strand members are composed of an extremely strong but highly flexible material such as special oriented nylon which has a low modulus of elasticity. Such material will operate for millions of flexes or belt revolutions around sheaves with very little stretch. The diameter of the pins 3 is somewhat larger than the holes 4, so that the pin is tight in the strand and the belt will not fall apart in operation. In operation all of the flexure of the belt takes place by reason of bending of the strands between the pins and there is no relative movement between the pins and the strands at their connection, and, thus, no wear and no enlargement of the holes in the nylon.

The foregoing illustrates that one of the more important aspects of the invention resides in having the strands extend through more than one pitch. This forces the belt to flex between the pins and eliminates the chordal action and the articulation at the joints which would cause wear if the strands extended through only one pitch.

As shown in FIG. 1 the elastic blocks may be substantially rectangular in plan, and are attached to the belt by bolts, or rivets 9, or the like which have heads 10 on the outer side of the tension-carrying part of the belt, and a shaft 11 which extends through an opening 12 between a pair of strand members 2 and through an opening 13 in a block 5. At the opposite end of opening 13 an enlargement 15 of the opening is provided for accommodating a retaining device 17 such as a rivet head. Of course, many other equivalent types of attaching and retaining devices could be used.

At about the centers of their lengths, the upper surfaces of the blocks 5 are provided with transverse recesses 6 for accommodating the adjacent enlarged part 8 of the tension carrying strands 2. These recesses are provided with flat bottoms 7 and curved side walls conforming with the shape of the enlargements of the tension-carrying strands as shown in FIG. 7.

On their undersides, each block 5 is provided with a transverse groove 20 which is rather deep and serves to make the blocks more flexible to accommodate the bending of the belt when passing around a sheave or pulley.

In practice the blocks 5 need not be made separate from each other but can be made attached to each other as represented in FIGS. 6, 7, and 8. At the points of connection 21 the blocks are provided with incisions 22, 24 extending toward each other one from the outer surface and the other from a side surface. These incisions do not meet but the space 25 therebetween is rather small and can easily be cut along line 26 to separate any two adjacent blocks when it is desired to shorten the length of the belt. It will be observed that even if a block has been separated from the next block but is still in use the shoulders 28 and 29 resulting from the incisions 22 and 24 and the separation cutting will engage each other and provide a certain amount of mutual support with relative articulation.

In FIG. 4 one of the tension-carrying strands is shown separately in elevation. It will be seen that the strand extends through four pitches of the belt, that is, the distance between five pin openings. Also it is to be noted that at each such opening the strand is enlarged as at 8 and that the bottoms 8a of the enlargements are flat, with concave approaching surfaces 8b except at the ends 8c.

FIG. 5 is an end view showing the strands to be comparatively flat.

The embodiment of the invention represented by FIGS. 9, 10, and 11 of the drawing illustrates the application of the invention to an open-end roller type belt. From FIG. 9 it will be seen that in this embodiment also the belt is composed of sets or assemblies of tension-carrying strands 32, composed of nylon or other suitable material, arranged divergently in pairs, 33, each pair extending through a plurality of pitches of the belt, in this case four pitches. In this embodiments the pins 34 are comparatively long, and the pairs, 33, of strands 32 are spaced apart at the center part of the belt leaving room on the pins 34 for cylindrical rollers 35 turnably mounted on the pins. The rollers may be composed of nylon to minimize friction or other suitable material.

Similarly as in the first embodiment of the invention the one end of a pair of strands 32 are comparatively close together and the strands then diverge though four pitches, although this principle could be applied to any practical number of pitches more than one.

FIGURE 10 shows the open-end roller belt applied to a combination sprocket and pulley 37. This sprocket and pulley is provided with recesses 39 which are cylindrical in their bottoms 40 to accommodate the rollers 35, and are provided with sprocket teeth 36 between said rollers which teeth pass in between the tension-carrying strands 32.

FIGURE 11 shows a side of the combination sprocket and pulley and from this it is apparent that the sprocket element has shoulders 37 outside the teeth 36 on which the nylon strands 32 engage in operation. These shoulders 37 are partially cylindrical as can be seen at 39 in FIG. 10, and the strands lie on them with smooth engagement and conform to their curvatures in operation and eliminates the chordal action common to all link type chains.

The embodiment of the invention according to FIGS. 12, 13, 14, and 15 represents the invention applied to an open-end sprocket belt or a so-called timing belt. In this embodiment a similar arrangement of the tension-carrying strands 42 is used, that is to say, the strands extend over more than one pitch of the belt, namely, four pitches, and are divergent from their one ends toward their other ends.

Numeral 43 designates pins which extend through enlargements 44 of the strands at the locations where openings 45 are provided for the pins to pass through the strands. The front and rear walls of the enlargements, are inclined toward each other as indicated at 46 and are concavely rounded at their junctions with the intermediate portions of the strands as at 47 in order to cooperate with the sprocket formations with which the belt is to work. The enlargements 44 have a greater height than the intermediate parts of the strands, except at the extreme ends 49 of the strands where the end portions beyond the first enlargement have the full height of the enlargement.

The sprocket wheel 50 with which this embodiment of the open-end belt is adapted to work is shown in FIGS. 4 and 15 as having a plurality of transverse grooves 51 spaced angularly about its periphery by distances corresponding to the pitch of the belt. These grooves correspond in shape to the bottom side of an enlargement of the belt, previously described. Also, the sprocket has a centrally located circumferentially extending groove 52 into which fit the extreme end portions 49 of the pairs of strands at their starting end in order to prevent dislodgement of the belt from the sprocket in operation.

It is to be understood that in describing the belt as being comprised of divergent strands, the matter of whether the stands are divergent or convergent is purely a matter of which direction is considered.

In each of the embodiments disclosed therein, the belt can be opened by removing a sufficient number of consecutive pins and a link either added or removed to change the length of the belt; or simply for the purpose of placing the belt around a continuous shaft without changing the length of the belt.

I claim:

1. An open-end power transmission belt comprising a plurality of links each link comprising a plurality of pairs of flexible tension-transmitting strands, the strands of each pair being arranged divergently with respect to each other, a plurality of transversely extending retaining pins spaced longitudinally of said belt at uniform distances, the distances apart of said pins defining a pitch of said belt, and one of said pairs of strands starting at each of said pins and extending through more than one pitch of the belt, said strands having enlargements at the locations of said pins, said enlargements having transversely extending openings through which said respective pins extend, said openings being of smaller diameter than said pins whereby said enlargements are bound on said pins against articulation relative thereto, said strands being of relatively small cross section between said enlargements of said strands to promote flexure in between said enlargements in operation.

2. An open-end power transmission belt according to claim 1, and in which the flexing of said belt will always be such that said pins will always remain parallel with the axis of the pulleys over which the belt travels, so that substantially the same stresses are imposed on each link of the belt.

3. An open-end transmission belt according to claim 1, and in which at their one ends the strands of a pair of strands are in close engagement with each other, and at their other ends are separated from each other by a plurality of others of said strands.

4. An open-end transmission belt according to claim 1, and in which said belt is provided with a plurality of elastic blocks disposed succesively in the direction of extent of said belt, and means securing said blocks to said pairs of strands.

5. An open-end transmission belt according to claim 4, and in which said securing means each comprises a shaft having a head located outside said pairs of strands, and said blocks have holes through which said shafts extend respectively.

6. An open-end transmission belt according to claim 5, and in which said shafts are provided with heads on their inner ends.

7. An open-end transmission belt according to claim 6, and in which the inner faces of said blocks are each provided with enlargements of said holes at their inner ends for accommodating said heads on said inner ends of said shafts.

8. An open-end transmission belt according to claim 4, and in which said blocks are provided with grooves on their outer faces extending transversely of said belt for accommodating the respective enlargements of said strands.

9. An open-end transmission belt according to claim 4, and in which said blocks are each provided with a deep groove on its inner face extending transversely of said belt to render said blocks more flexible.

10. An open-end transmission belt according to claim 4, and in which some of the blocks are joined together relatively by small, easily severed connecting areas.

11. An open-end transmission belt according to claim 10, and in which said blocks are each provided with narrow incisions extending toward but not completely to said connecting areas.

12. An open-end transmission belt according to claim 1, and in which said strands of said pairs are spaced apart laterally of said belt and rollers are provided on said retaining members between said strands of said pairs.

13. An open-end transmission belt according to claim 1 and in which said strands are provided with extensions at their one ends of greater thickness than the remainder of said strands intermediate said enlargements which extensions serve to engage in a central circumferential groove in a pulley.

References Cited by the Examiner

UNITED STATES PATENTS

| | | | |
|---|---|---|---|
| 500,332 | 6/1893 | Hunt | 74—245 |
| 3,054,300 | 9/1962 | Bowman | 74—245 |

FOREIGN PATENTS

| | | |
|---|---|---|
| 124,028 | 4/1947 | Australia. |

DAVID J. WILLIAMOWSKY, *Primary Examiner.*

J. A. WONG, *Assistant Examiner.*